UNITED STATES PATENT OFFICE.

WILLIAM J. WATKINS, OF FORT WORTH, TEXAS, ASSIGNOR OF ONE-HALF TO NANNIE G. DRUMM, OF FORT WORTH, TEXAS, AND ONE-FOURTH TO JOHN A. WISHERD, OF STANTON, NEBRASKA.

PUNCTURE-CLOSING COMPOUND.

1,062,426.     Specification of Letters Patent.     Patented May 20, 1913.

No Drawing.     Application filed November 5, 1912. Serial No. 729,617.

*To all whom it may concern:*

Be it known that I, WILLIAM J. WATKINS, a citizen of the United States, residing at Fort Worth, in the county of Tarrant and State of Texas, have invented certain new and useful Improvements in Puncture-Closing Compounds, of which the following is a specification.

My invention relates to a composition for closing the punctures or blow-outs in tires for automobiles or other vehicles using inflatable tires, and the object is to provide a simple composition of materials which will form a highly efficient puncture closing or tire patching mixture and which will act quickly and automatically so that a puncture or blow-out will be closed almost instantaneously without the attention of the driver or operator and which is not expensive, considering the great advantages derived therefrom.

Other objects and advantages will be fully explained in the following description and the invention will be more particularly pointed out in the claims.

The new composition is prepared from wood fiber, cotton, asbestos, rubber fiber and other ingredients. It must be understood that any one of the above named ingredients may be used or all may be combined or any number of them may be combined in the mixture. Other ingredients used include dextrin, gum arabic, shellac, wood alcohol, aqua ammonia, oil of cedar, and water. The ingredients are mixed in the following proportions:—Two pounds of wood fiber, two pounds of dextrin, one pound of gum arabic, four ounces of shellac, ten ounces of wood alcohol, ten ounces aqua ammonia, one ounce of oil of cedar, and enough distilled water to make five gallons of the composition. The ingredients are thoroughly compounded and reduced to a liquid consistency. Instead of the wood fiber, two pounds of cotton, or asbestos, or rubber, or rubber fiber, may be substituted therefor, or two pounds of all these combined or two pounds of any combination of the wood fiber, cotton, asbestos, rubber, and rubber fiber may be substituted for the wood fiber. When prepared, the composition should not be exposed to the atmosphere for any considerable length of time as it will not remain in the liquid state when exposed to the atmosphere. The composition is to be used in the liquid state and will remain in the liquid state when inclosed in a tire. The composition is placed in the liquid state in the tire in sufficient quantity to cover the interior surface of the inner tube. The tire may be revolved to spread the liquid to all parts of the interior thereof. When in use, the revolving of the wheels will keep the composition spread to the parts of the tire liable to punctures and when a puncture is made, the composition will close the puncture instantaneously. The air pressure aids the composition in closing the puncture.

What I claim, is,—

1. A composition for closing punctures in inflatable tires consisting of two pounds of fiber, two pounds of dextrin, one pound of gum arabic, four ounces of shellac, ten ounces of wood alcohol, ten ounces of aqua ammonia, one ounce of oil of cedar, and enough water to make five gallons.

2. A liquid composition for closing punctures in inflatable tires consisting of fiber, dextrin, gum arabic, shellac, wood alcohol, aqua ammonia, oil of cedar, and water.

In testimony whereof, I set my hand in the presence of two witnesses, this 25th day of October, 1912.

WILLIAM J. WATKINS.

Witnesses:
A. L. JACKSON,
J. W. STITT.